May 7, 1929.  E. M. ANDRES ET AL  1,711,981
MECHANICAL GRAPH
Filed July 5, 1927
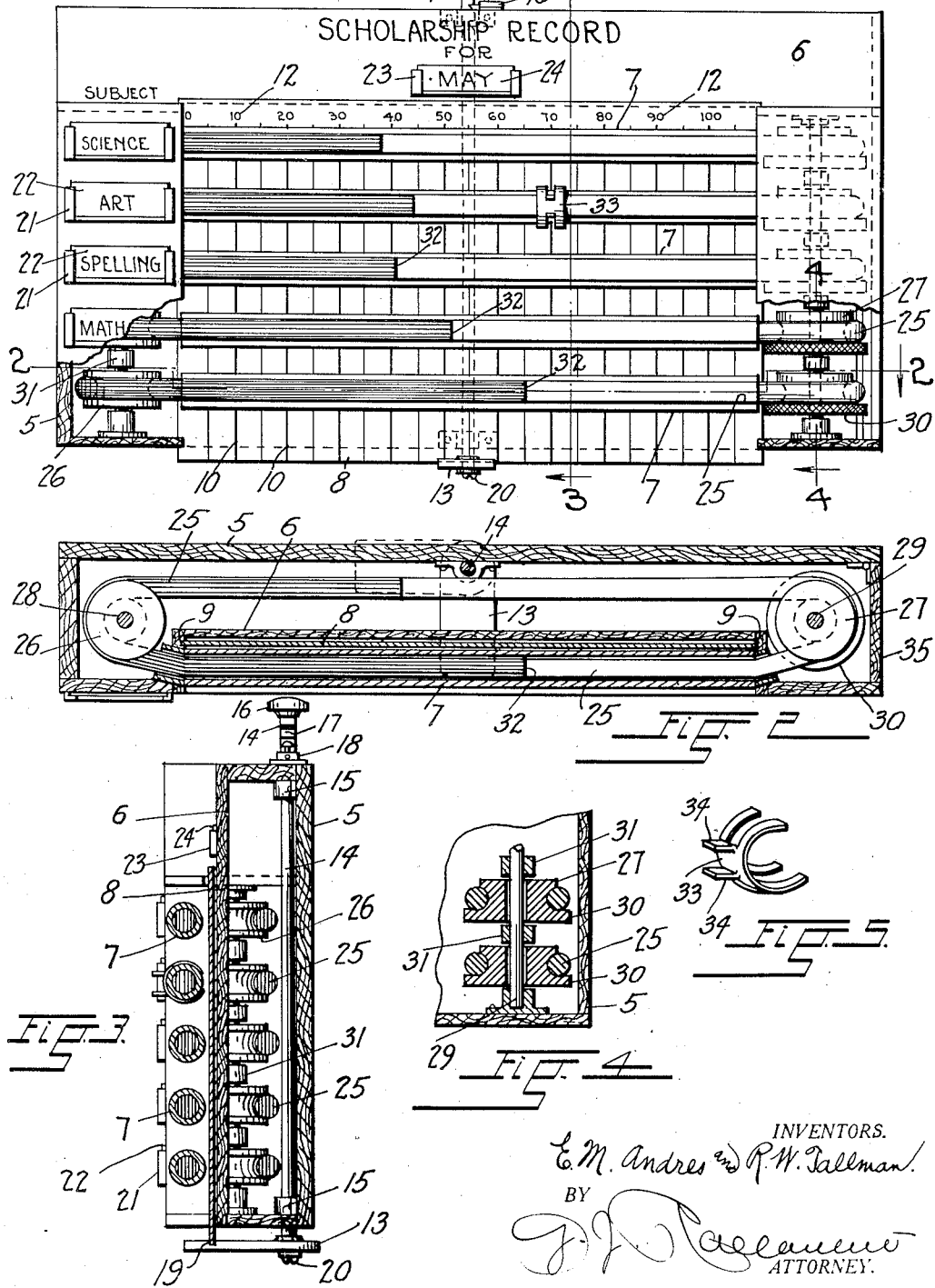

Patented May 7, 1929.

1,711,981

UNITED STATES PATENT OFFICE.

EDWARD M. ANDRES AND RUSSELL W. TALLMAN, OF GUNNISON, COLORADO.

MECHANICAL GRAPH.

Application filed July 5, 1927. Serial No. 203,573.

This invention relates to mechanical graph charts and more particularly to charts of the type disclosed in our application for Patent No. 147,253, filed on the 9th day of November, 1926, of which the present application is a continuation in part.

It is an object of the invention to provide in a mechanical chart, indicative devices consisting of flexible bands or cords movable upon a face of a support and providing indicia to designate different grades upon a scale on the support.

Another object is to provide transparent guide tubes which separate the flexible bands from the face of the support and provide a space for the insertion of a graduated record sheet.

A further object of the invention resides in the provision of a novel mounting for the flexible bands by which they may be individually adjusted. A further object is to provide clips of simple construction, embracing the guide tubes for the purpose of showing maximum and minimum points after the indicative bands are adjusted to designate a different degree and still another object resides in providing a mechanical appliance for the adjustment of record cards upon the support so that different parts thereof may be brought in line with the indicatory devices for the main purpose of making comparative records upon the same card.

In the accompanying drawings in the several views of which like parts are similarly designated by numerical reference characters, Figure 1 represents a face view of the graph chart, partially broken to expose covered parts of the mechanism for mounting the indicative devices included in the construction, Figure 2, a section taken on the line 2—2, Figure 1, Figure 3, a section along the line 3—3, Figure 1, Figure 4, a fragmentary section along the line 4—4 Figure 1, and Figure 5, an enlarged perspective view of one of the clips which are mounted on the guide tubes of the chart to indicate previously designated degrees after the indicative bands in the respective tubes have been moved to designate different degrees upon the graduated scale behind the tubes.

The graph chart is particularly designed to graphically display comparative facts in an intelligent and readily understood manner, and to make permanent records of such facts and it is adapted for use in commercial fields as well as for educational purposes.

In the drawings, the device has been illustrated as adapted for recording the progress and motivation of scholars in different arts, but as stated before the device is not limited to this use but may be employed in different fields too numerous for individual mention or illustration.

Referring further to the drawings, the mechanical chart comprises a casing 5 having a sunken or depressed front 6 of reduced width. Mounted in alined apertures of the sides of the depression are parallel and preferably equidistantly spaced transparent tubes 7 which guide the indicative members of the chart hereinafter to be described.

The guide tubes are spaced from the front of the casing for the insertion of a card or record sheet 8 and the sides of the depression are longitudinally grooved as at 9 to admit the edges of the sheet. The record sheet as shown bears a series of evenly spaced lines 10 and at the ends thereof, numbers 12 indicative of degrees. The scale thus formed upon the removable record sheet may also be printed or otherwise affixed to the face of the front of the casing so that the chart may, if so desired, be used without the record sheets, for exhibition purposes.

The record sheets are supported for transverse adjustment with reference to the guide tubes, upon a foot 13 at the end of a rod 14 which is slidably mounted in bearings 15 inside the casing. The foot at the lower end of the rod extends below the casing and the upper portion of the rod projects above the same and is provided with a knob or head 16 to facilitate its manipulation. The upper portion of the rod has a series of notches 17 cooperative with a spring bolt 18 which is fastened on the top of the casing.

The bolt secures the rod in its adjusted positions and it may be retracted for the adjustment of the rod whenever it is desired to vary the position of the record sheet relative to the guide tubes.

The foot of the rod upon which the record sheet is supported is grooved as at 19 to provide a seat for the lower edge of the sheet and it is pivoted on the rod by means of a screw 20 so that it may be turned aside as shown in broken lines in Figure 2, when its service is not required.

At one side of the depressed front of the casing are a number of pockets 21 preferably composed of a shallow ledge and flanges at opposite sides thereof, to hold cards 22 upon which the arts or other subjects for which the records are to be made upon the graduated record sheets, are prominently displayed.

The pockets are alined with the guide tubes, and above the series of tubes is another similar pocket 23 to receive a card 24 indicative of the period for which the record is made. The indicative elements hereinbefore referred to each consist of an endless band or cord 25 mounted upon flanged sheaves or pulleys 26 and 27 at opposite sides of the sunken front. The sheaves are loosely mounted inside the casing upon shafts 28 and 29 so that they may turn separate from each other for individual adjustment of the endless bands.

The pulleys 27 at one side of the front of the casing have one of their flanges 30 enlarged and peripherally milled to facilitate their manual rotation on the shaft on which the pulleys are mounted and the casing has at the same side of the front a hinged door 35 which affords access to the pulleys. This door may be provided with suitable locking means to prevent unauthorized adjustment of the indicatory elements.

Collars 31 on the shafts, between the pulleys hold the latter against lateral displacement.

Parts of the endless bands are colored in contrast with other parts of the same and the divisions 32 between the contrasting sections of the bands provide the indicia which designate the different grades on the scale of the record sheet.

It is to be understood however that other means may be employed to provide the bands with a contrasted part or mark as an indicative medium.

For the purpose of showing points on the scale to which the indicative elements have been adjusted, after the elements have been moved to indicate different points on either the same scale or another scale, the clips 33 are provided. The clips are made of strips of resilient material curved to fit the guide tubes and formed with outwardly projecting finger pieces 34 to facilitate manipulation. The clips are slidable on the guide tubes so that they may be readily adjusted to any part of the scale on the record sheet.

In the operation of the mechanical chart, the different subjects or names of scholars, salesmen or others, are indicated by cards inserted in the pockets 21, and the period for which the record is to be made by a card inserted in the pockets 23. An appropriately ruled and divided record sheet 8 is inserted in the space between the guide tubes and the front of the casing and the bands 25 are moved by rotation of the pulleys to designate different degrees on the scale of the record sheet by their distinctive indicia 32.

In case it is desired to make a comparative showing of a record previously made on the sheet, with the designations of the indicatory element, the record sheet is adjusted by means of the rod 14 so that the previous records may be observed in the spaces between the guide tubes. In this respect it is to be understood that after the indicative elements of the devices have been adjusted to designate the different degrees in the respective arts or for the respective scholars or salesmen, the designated points are indicated with pencil or ink on the record sheets and the latter may afterwards be ruled or colored or otherwise marked to provide a permanent record.

The use of the clips has been explained hereinbefore and requires no further description at this point.

It will be understood that changes in the construction and arrangement of the parts comprised in the graph chart as shown and described may be resorted to without departing from the spirit of the invention. The indicatory elements may, for example, be arranged vertically instead of horizontally and the arrangement of the names of the subjects or persons for which the records are made and the character of the scales on the record sheets may be varied in accordance with the nature of the records.

Having thus described our invention, what we claim and desire to secure by Letters Patent is:—

1. A graph chart comprising a support, an indicative element movable across a face of the support in spaced relation to said face, a record sheet in said space, and means for moving the sheet in a direction transverse to the movement of the indicative element.

2. A graph chart comprising a support, an indicative element movable across a face of the support in spaced relation to said face, a record sheet in said space, a support for the sheet, and means to move the support, and thereby the sheet, in a direction transverse to the movement of the indicative element.

3. A graph chart comprising a support, an indicative element movable across a face of the support in spaced relation to said face, a record sheet in said space, an adjustable rod on the support, a foot on the rod on which the sheet is supported, and a latch to secure the rod in its adjusted positions.

4. A graph chart comprising a support, transparent guide tubes extending across a face of the support in spaced relation to said face, indicative elements movable through the guide tubes, a record sheet slidable in said space, and means for adjustment of the sheet to selected positions relative to the guide tubes.

5. A graph chart comprising a support having a sunken front, transparent guide tubes extending across the front between opposite sides thereof, and endless indicative members movably mounted on the support beyond said sides and passing through the guide tubes.

6. A graph chart comprising a support having a sunken front opposite sides of which are grooved, transparent guide tubes spaced from the front and extending between the sides thereof, a record sheet slidable in the grooves of the sides within said space, indicative members movable in the tubes, and means for the support of the record sheet.

7. A graph chart comprising a support, a record sheet on the support, a transparent guide tube extending across the sheet, and a movable band in the tube having indicatory means cooperating with the sheet.

8. A graph chart comprising a support, a record sheet on the support, a transparent guide tube extending across the sheet, and an endless band passing through the tube and having indicatory means cooperating with the sheet.

9. A graph chart comprising a support, a record sheet on the support, a transparent guide tube extending across the sheet, a band in the tube having indicatory means cooperating with the sheet, and an indicative clip slidable on the tube, cooperating with the sheet.

10. A graph chart comprising a support, a record sheet on the support, a transparent guide tube extending across the sheet, a band in the tube having indicatory means cooperating with the sheet, and an indicative clip slidable on the tube, cooperating with the sheet, the clip having finger pieces for its manipulation.

11. A graph chart comprising a support having a sunken front, a record sheet on said front, transparent guide tubes extending across the record sheet between opposite sides thereof, and endless indicative members movably mounted on the support between said sides and passing through the guide tubes.

In testimony whereof we have affixed our signatures.

EDWARD M. ANDRES.
RUSSELL W. TALLMAN.